(12) United States Patent
Gloede et al.

(10) Patent No.: US 7,769,163 B2
(45) Date of Patent: Aug. 3, 2010

(54) ELECTRONIC DEVICE DISPLAY APPARATUS

(76) Inventors: Peter Gloede, 344 Roberts Rd., Inverness, IL (US) 60010; Robert Johnson, 4341 Triple Crown Dr., Concord, NC (US) 28027

( * ) Notice: Subject to any disclaimer, the term of this patent is extended or adjusted under 35 U.S.C. 154(b) by 1299 days.

(21) Appl. No.: 11/161,662

(22) Filed: Aug. 11, 2005

(65) Prior Publication Data

US 2007/0035913 A1  Feb. 15, 2007

(51) Int. Cl.
 *H04M 1/00* (2006.01)
(52) U.S. Cl. ...................................... 379/455
(58) Field of Classification Search .................. 379/455
 See application file for complete search history.

(56) References Cited

U.S. PATENT DOCUMENTS

| | | | |
|---|---|---|---|
| 5,052,943 A | 10/1991 | Davis | |
| 5,205,447 A * | 4/1993 | Hambrick | ............... 224/42.33 |
| 5,230,016 A | 7/1993 | Yasuda | |
| D344,708 S | 3/1994 | Ho | |
| D370,681 S | 6/1996 | Diamond | |
| D374,014 S | 9/1996 | Nagele et al. | |
| D386,495 S | 11/1997 | Schmoll | |
| D402,666 S | 12/1998 | Golder | |
| D407,408 S | 3/1999 | Hoff | |
| D412,162 S | 7/1999 | Tal et al. | |
| D420,974 S | 2/2000 | Minagawa | |
| D420,989 S | 2/2000 | Sandhu et al. | |
| 6,084,963 A | 7/2000 | Hirai et al. | |
| 6,179,122 B1 * | 1/2001 | Moncrief et al. | ............ 206/320 |
| D452,236 S | 12/2001 | Kohli | |
| D460,962 S | 7/2002 | Peiker | |
| 6,483,698 B1 | 11/2002 | Loh | |
| 6,554,437 B2 * | 4/2003 | von Glasow | ................ 359/872 |
| D475,044 S | 5/2003 | Kohli et al. | |
| D478,073 S | 8/2003 | Topinka | |
| 2002/0042251 A1 | 4/2002 | Tsai | |

* cited by examiner

*Primary Examiner*—Alexander Jamal
(74) *Attorney, Agent, or Firm*—Law Office of Marc D. Machtinger, Ltd.

(57) ABSTRACT

A display apparatus for an electronic device which takes on the appearance of an unrelated object is disclosed. The electronic device display apparatus has an upper surface, wherein the upper surface is shaped to resemble an unrelated object. A portion of the upper surface is moveable between an open position and a closed position. When closed, the movable surface completes the upper surface and further enhances the display properties of the device. When open, the device is suitable for holding and displaying an electronic device. Interior to the apparatus are one or more electronic device supporting surfaces to support the electronic device at the desired display position. Also interior to the apparatus is a passage which permits a user to thread or otherwise route a battery charging cord into the apparatus. The apparatus also has a bottom surface which can resemble the underside of the unrelated object.

12 Claims, 4 Drawing Sheets

ELECTRONIC DEVICE DISPLAY APPARATUS

BACKGROUND

The present invention relates to an electronic device display apparatus, and more specifically to an electronic device display apparatus, particularly a cellular telephone display apparatus, having a hinged top and taking on the appearance of an unrelated object.

DESCRIPTION OF THE RELATED ART

Cellular telephones and similar wireless or radio telephones are commonplace today. In many instances people have foregone the traditional hard wired telephone and rely solely on their wireless telephone. As technology has advanced, the size of these telephones has been reduced. When not being carried on the body of the user, these telephones are often left on a desk, a counter, on a vehicle dashboard or console, in a purse, in a backpack or some other place.

Various holders for these types of telephones and other electronic devices, such as personal digital assistants and portable digital music players, have been developed. These holders allow the user to place the telephone or device in a convenient and consistent location as well as provide the user with a view of the telephone or device when, for instance, a call is incoming to the telephone. For example, U.S. Design Pat. No. D460,962, issued to Peiker, shows a holder for a cellular telephone (the Peiker Holder). The Peiker holder shows a substantially cylindrical device with a portion thereof removed, with the removed portion sized to secure a cellular telephone. Also shown are connection means for connecting the telephone to a battery charger or other device.

Other types of telephone holders are designed to camouflage the telephone such that the telephone is encompassed by a device that looks like and unrelated object. For example, published U.S. patent application Ser. No. 09/880,069, Publication No. 2002/0042251, discloses a cellular telephone ornament structure. The invention in the published application consists of a cellular telephone and an assembly stand. The assembly stand is in the form of a box that holds the cellular telephone. The box is sized to fit into the empty body of specially designed models. As shown the model can be a car. However, this invention is not for display of the telephone, rather this invention is intended for use when the telephone is in use. For example, to an outside observer, a user of this device would look to be holding a model car, or other object to their ear, rather than a cellular telephone.

Other devices have been developed to compactly support an electronic device. For example, U.S. Pat. No. 6,483,698, issued to Loh, discloses a cradle with a moveable back supporting element (the Loh cradle). The Loh cradle has a base portion having a supporting surface which supports an end surface of a PDA when the PDA is received by the cradle. The cradle also has a support element hingedly coupled to the base portion and movable between a first predetermined position in which the support element supports a first portion of a major surface of the PDA when the PDA is received by the cradle, and a second predetermined position in which the support element covers the supporting surface of the base portion. The base portion also has a second supporting surface which supports a second portion of the major surface of the PDA when the PDA is received by the cradle, such second supporting surface being substantially orthogonal to the supporting surface. When the PDA is received by the cradle, a data connector and charging contacts on the PDA electrically couple with a data connector and charging contacts of the cradle. While this cradle is suitable for its intended purpose, namely receiving and supporting a portable electronic device, the cradle is not suitably designed as a display piece in and of itself. Furthermore, this invention requires that the cradle receive the PDA, which limits the cradle to a specific model or brand of PDA. Thus if a user of the Loh cradle desires to use another model or brand of PDA, the user must acquire another cradle.

There remains a need for an electronic device display apparatus that can take on the appearance of an unrelated object. Furthermore, there remains a need for an electronic device display apparatus that can take on the appearance of an unrelated object and can accommodate a variety of electronic devices. Therefore, it would be desirable to produce a display apparatus for a cellular telephone or similar electronic device that can take on the appearance of an unrelated object and preferably accommodate a variety of cellular telephones or other electronic devices.

SUMMARY

In view of the deficiencies described above, it is an object of the present invention to provide an electronic device display apparatus that can take on the appearance of an unrelated object.

It is a further object of the present invention to provide an electronic device display apparatus that can take on the appearance of an unrelated object and accommodate a variety of cellular telephone or other electronic devices.

In accordance with the above objectives, the present invention is an electronic device display apparatus which takes on the appearance of an unrelated object. The apparatus has an upper surface, wherein the upper surface is shaped to resemble an unrelated object. Preferably, upper surface is finished in such a manner as is known in the art for collectable and display type items to render the apparatus a display item in and of itself.

A portion of the upper surface is moveable. The movable surface can be connected to the apparatus by a hinge at one end of the movable surface. Another end of the movable surface can be releasably secured to the apparatus by a latch. When in a closed position, the movable surface completes the upper surface and further enhances the display properties of the apparatus. In various preferred embodiments a portion of the movable surface has an electronic device back support, which helps maintain the electronic device at a desired display position.

When in an open position, the apparatus is suitable for holding and displaying an electronic device, such as a cellular telephone, a personal digital assistant, or a portable digital music player. Interior to the apparatus are one or more electronic device supporting surfaces. The electronic device supporting surfaces are concealed when the movable surface is in the closed position and accessible when the movable surface is in the open position. The electronic device supporting surfaces support the electronic device at the desired display position. In various preferred embodiments, there can be one or more speakerphone vents at desired locations. Speakerphone vents can reduce the muffling of incoming and outgoing sound when the electronic device is cellular telephone being used in a speakerphone mode. Thus, the electronic device as a cellular telephone can be used in speakerphone mode while being displayed in the apparatus.

Also interior to the apparatus is a passage which permits a user to thread or otherwise route a cord, such as a battery charging cord or a computer connecting cord, into the apparatus and thus allow the electronic device to be charged or otherwise connected while being displayed. The passage is concealed when the movable surface is in the closed position and accessible when the movable surface is in the open position. Having a passage for a cord allows the apparatus to be used with a variety of electronic devices without redesign and without reproduction of the various electrical connectors found in electronic device cradles and battery charging stands.

The theme of the apparatus taking on the appearance of an unrelated object can be continued onto the underside of the apparatus. The apparatus has a bottom surface which can resemble the underside of the unrelated object. In various preferred embodiments disposed, molded, or otherwise created within bottom surface is a cord recess for threading or otherwise routing and preferable removably securing the cord. Removably securing the cord in the cord recess can prevent the cord from unintentionally sliding or otherwise becoming dislodged from its desired location and can reduce the visual clutter often caused by the myriad of cords and cables often associated with electronic devices by concealing the a portion of the cord within the apparatus.

Other features and advantages of the invention will be apparent from the following detailed description taken in conjunction with the following drawings wherein like reference numerals represent like features.

DETAILED DESCRIPTION OF THE INVENTION

Figure 1:
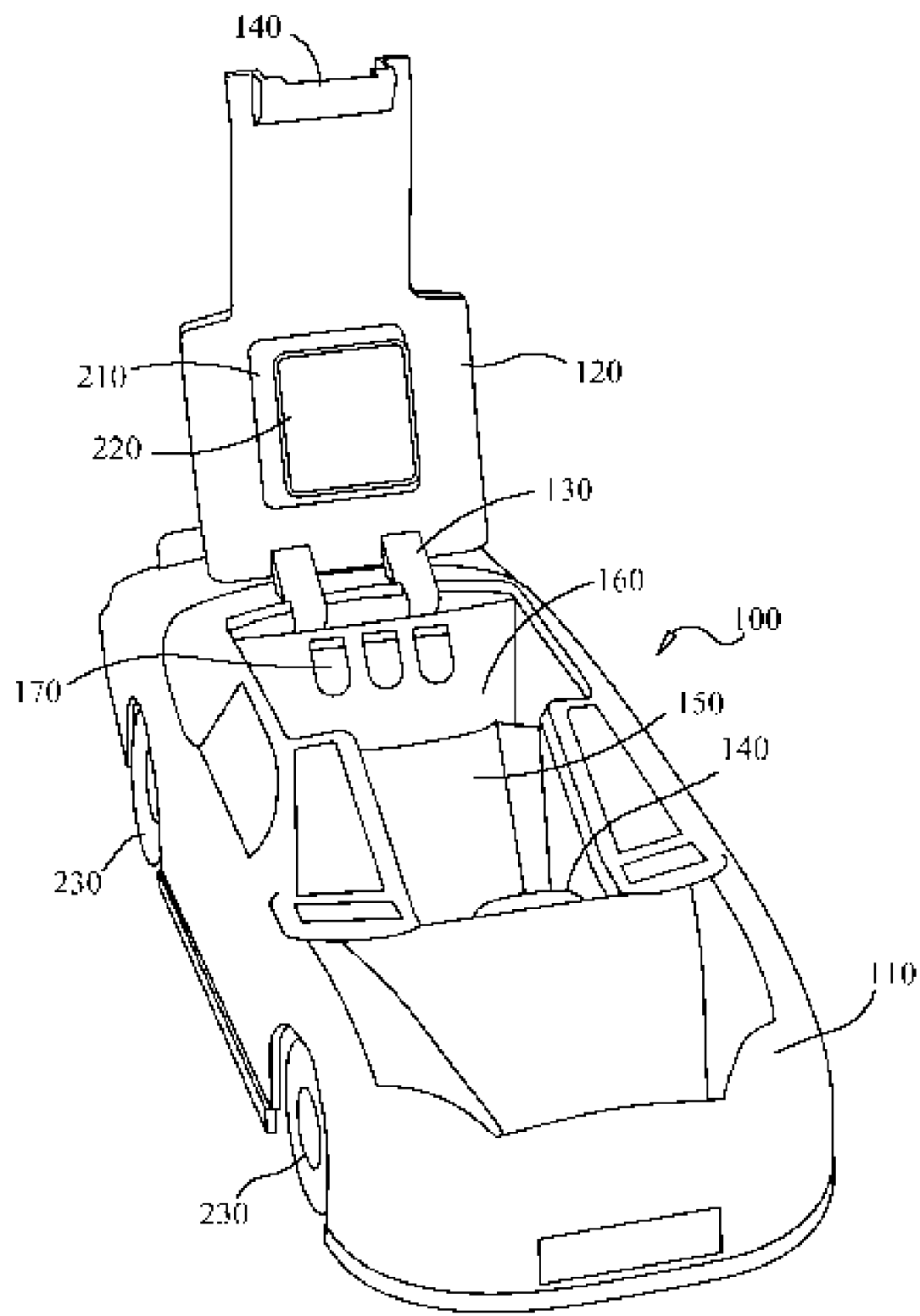
FIG. 1 shows a front upper perspective view of an electronic device display apparatus according to the present invention having a movable surface in an open position.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
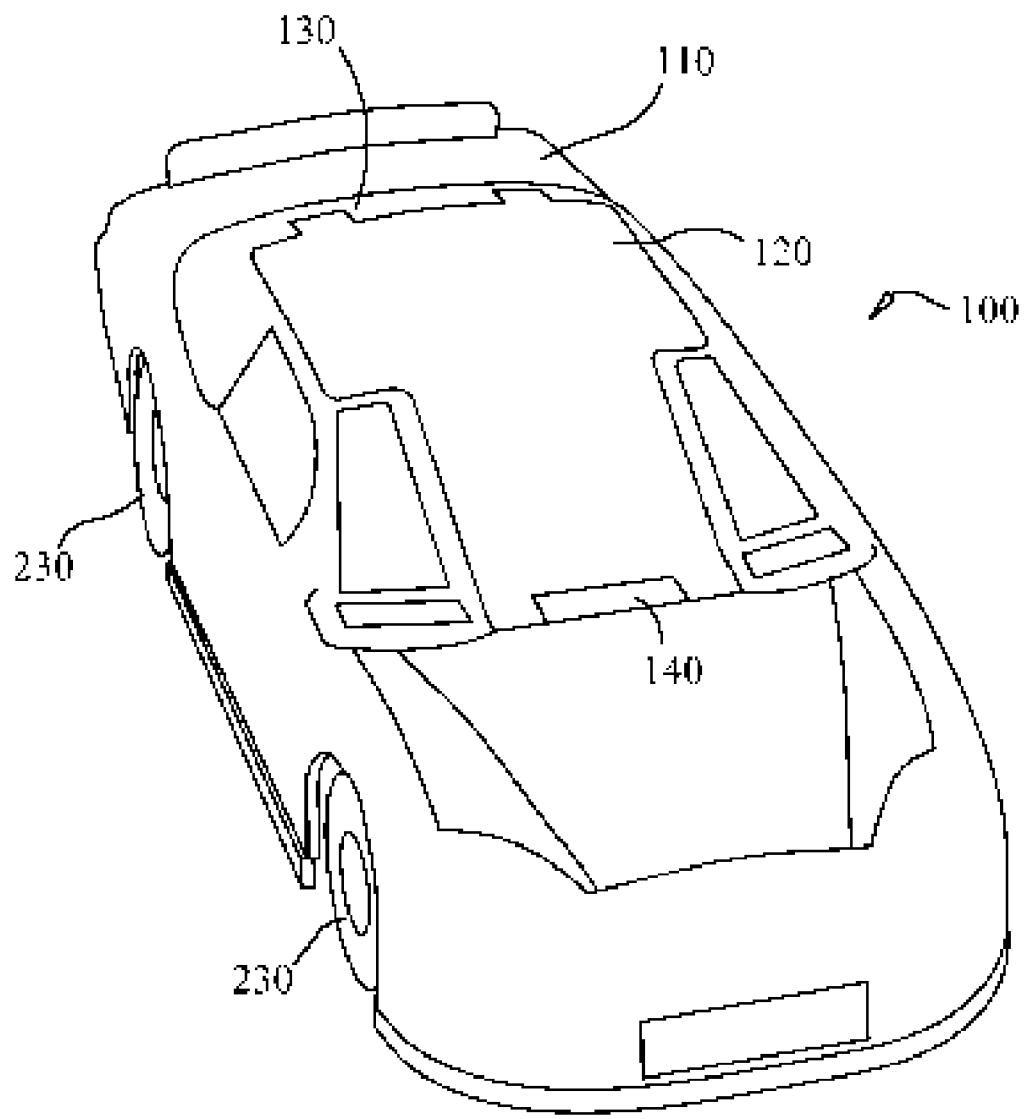
FIG. 2 shows a front upper perspective view of an electronic device display apparatus according to the present invention having the movable surface in a closed position.

The present invention is an electronic device display apparatus 100 which takes on the appearance of an unrelated object. FIG. 1 shows a front upper perspective view of an electronic device display apparatus according to the present invention having a movable surface in an open position. FIG. 2 shows a front upper perspective view of an electronic device display apparatus according to the present invention having the movable surface in a closed position. The electronic device display apparatus 100 has an upper surface 110, wherein the upper surface 100 is shaped to resemble an unrelated object.

The unrelated object can be, but is not limited to, a vehicle, such as an automotive vehicle, an aircraft, or watercraft. In various preferred embodiments, the unrelated object can be almost any other object desired by the manufacturer, including, but not limited to, other vehicles, household or office objects, scale or full size replica models of other display type items. By way of example, and not as a limitation, these display type items can include, but are not limited to sports collectibles, such as replica headgear. Preferably, upper surface 110 is finished in such a manner as is known in the art for collectable and display type items to render the apparatus 100 a display item in and of itself. Apparatus 100 may also have additional components that further enhance apparatus 100 taking on the appearance of an unrelated object and improve performance of the apparatus 100. For example, for instances where apparatus 100 takes on the appearance of an automobile, apparatus 100 may have tires 230 which can be constructed from rubber-like or other soft materials known in the art which prevent marring or otherwise protect surfaces onto which the apparatus 100 is placed. When apparatus 100 takes on the appearance of other unrelated objects, other means may be used to protect surfaces onto which the apparatus 100 is placed.

A portion of the upper surface 110 is movable. Movable surface 120 can be connected to the apparatus 100 by a hinge 130 at one end of the movable surface 120. Another end of the movable surface 120 can be releasably secured to the apparatus 100 by a latch 140. Movable surface 120 is movable between an open position and a closed position. When in a closed position, the movable surface 120 completes the upper surface 110 and further enhances the display properties of the apparatus 100. In various preferred embodiments a portion of the movable surface 120 has an electronic device support 210, which helps maintain the electronic device 200 at a desired display position when the movable surface 120 is in an open position.

When in an open position, the apparatus 100 is suitable for holding and displaying an electronic device 200. Interior to the apparatus 100 are one or more electronic device supporting surfaces 160. Electronic device supporting surfaces 160 are concealed when the movable surface 120 is in the closed position and accessible when the movable surface 120 is in the open position. The electronic device supporting surfaces 160 support the electronic device 200 at the desired display position. In various preferred embodiments, there can be one or more vents 170 at desired locations. Vents 170 are concealed when the movable surface 120 is in the closed position and accessible when the movable surface 120 is in the open position. Vents 170 can reduce the muffling of incoming and outgoing sound when the electronic device 200 is a cellular telephone being used in a speakerphone mode. Thus, the electronic device 200 as a cellular telephone can be used in speakerphone mode while being displayed in the apparatus 100.

Electronic device supporting surfaces 160 and or electronic device support 210 can be covered or lined with protective padding 220. Protective padding 220 protects the surfaces of the electronic device 200. Protective padding 220 can also help hold the electronic device 200 in position against accidental jarring. Furthermore, protective padding 220 can also dampen vibrations that may occur when the electronic device 200 is active. For example, when electronic device 200 is a cellular telephone, protective padding 220 can dampen vibrations that may occur when the cellular telephone rings. In various preferred embodiments protective padding 220 is constructed from foam or similar materials and is approximately one-sixteenth inch ($1/16"$) thick. Different thicknesses and or different configurations of protective padding 220 can be used to more universally accommodate a variety of electronic devices 200 in the apparatus.

Also interior to the apparatus 100 is a passage 150 which permits a user to route a cord (not shown), such as a battery charging cord or a computer connecting cord, into the apparatus 100 and thus allow the electronic device 200 to be charged or otherwise connected while being displayed. Passage 150 is concealed when the movable surface 120 is in the closed position and accessible when the movable surface 120 is in the open position. Having passage 150 for the cord allows the device 100 to be used with a variety of electronic devices 200, without redesign and without reproduction of the various electrical connectors found in electronic device cradles and battery charging stands.

Figure 3:
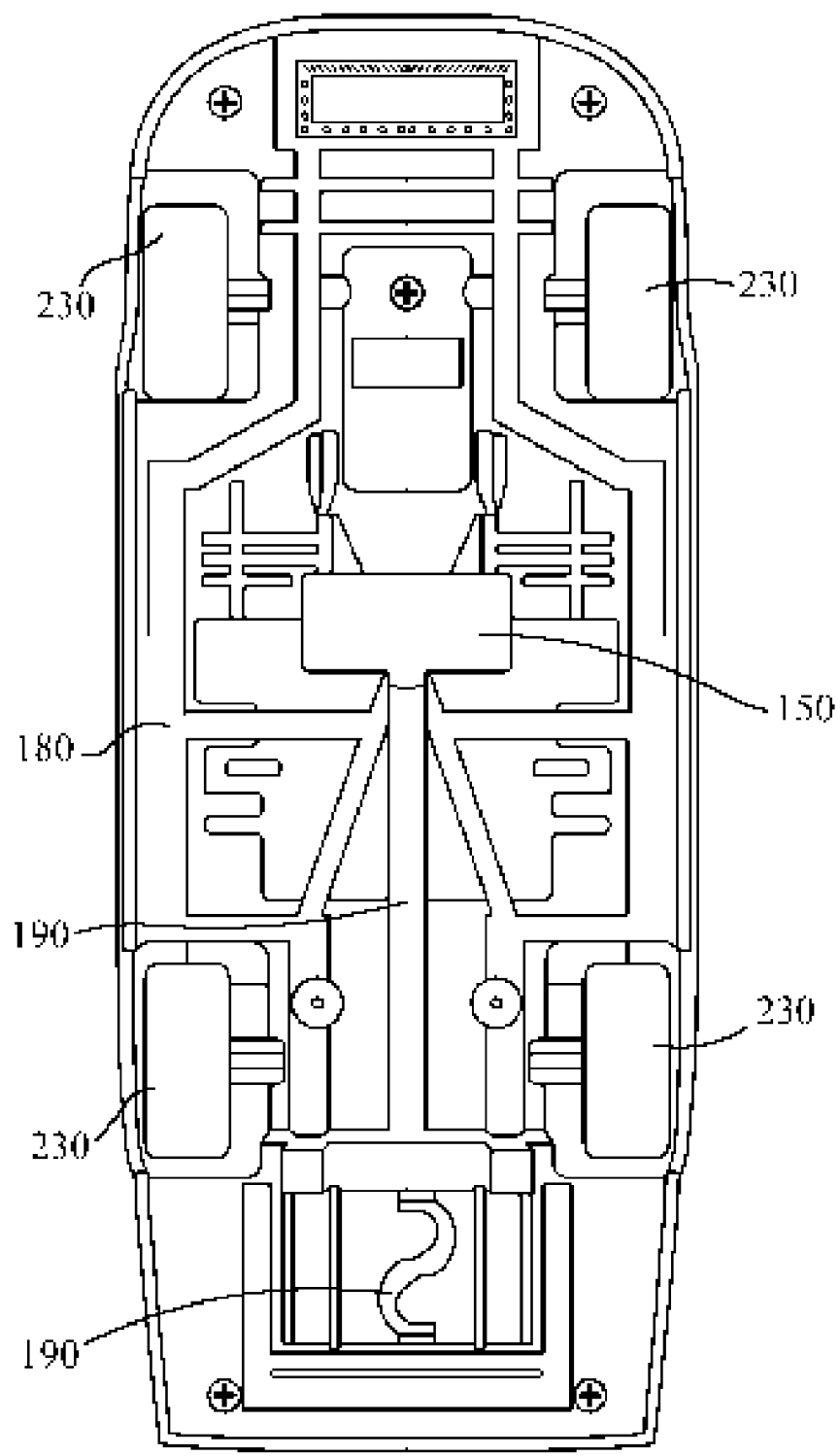
FIG. 3 shows a bottom view of an electronic device display apparatus according to present invention.
Figure 4:
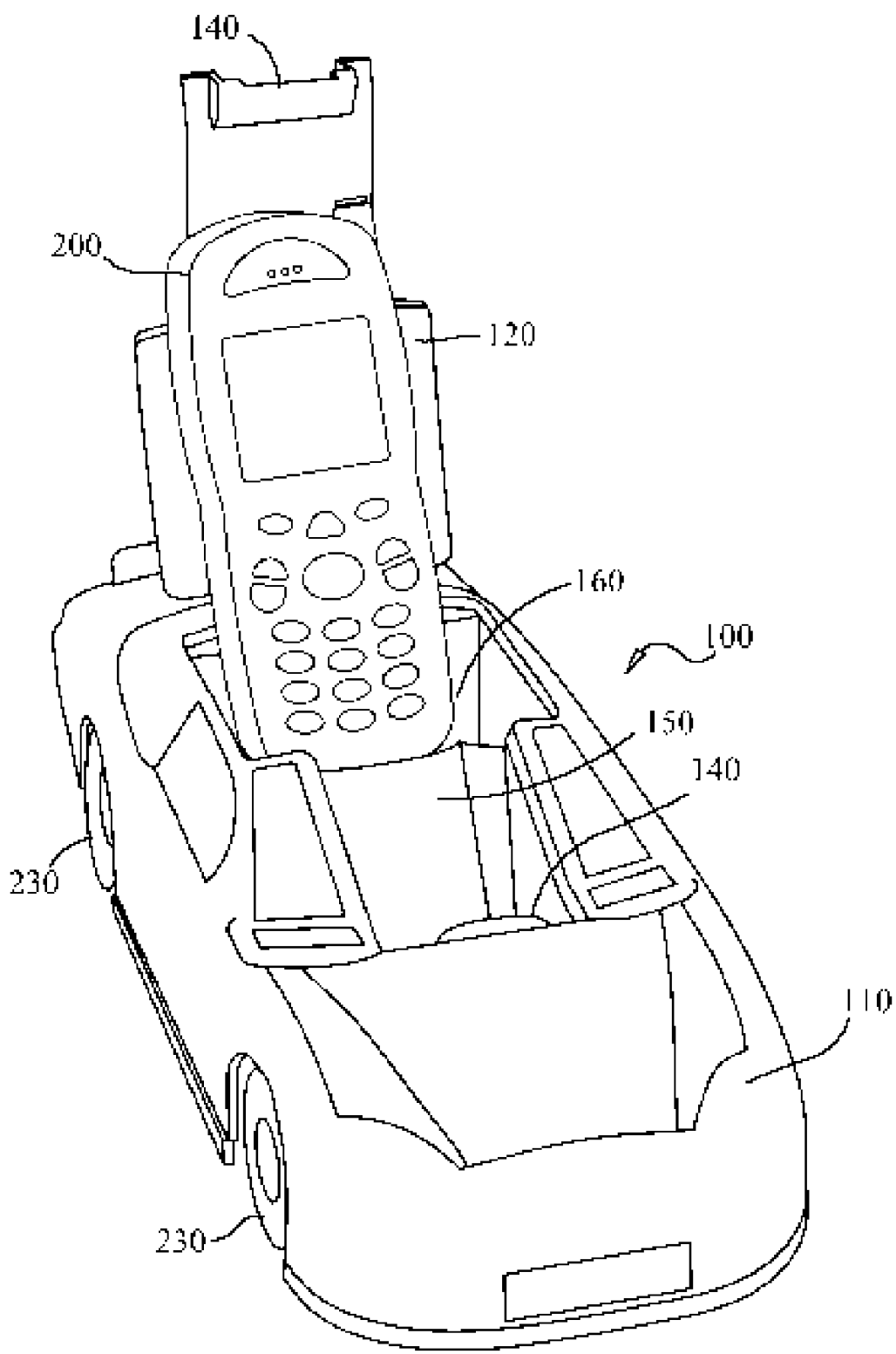
FIG. 4 shows an electronic device display apparatus according to the present invention having a movable surface in an open position and an electronic device displayed therein.

FIG. 3 shows a rear lower perspective view of an electronic device display apparatus according to present invention. The theme of the apparatus 100 taking on the appearance of an unrelated object can be continued onto the underside of the apparatus 100. The apparatus 100 has a bottom surface 180 which can resemble the underside of the unrelated object. In various preferred embodiments disposed, molded, or otherwise created within bottom surface 180 is a cord recess 190 for threading or otherwise routing and preferable removably securing the cord (not shown). Removably securing the cord in the cord recess 190 can prevent the cord from unintentionally sliding or otherwise becoming dislodged from its desired location and can reduce the visual clutter often caused by the myriad of cords and cables often associated with electronic devices 200 by concealing the a portion of the cord within the apparatus 100.

While the specific embodiments have been illustrated and described, numerous modifications come to mind without significantly departing from the spirit of the invention, and the scope of protection is only limited by the scope of the accompanying claims.

What is claimed is:

1. An electronic device display apparatus comprising:
    an upper surface resembling an object which is aesthetically unrelated to an electronic device for which said electronic device display apparatus is adapted to support, wherein a portion of said upper surface is a movable surface,
    said movable surface movable between an open position and a closed position,
    wherein a first end of said movable surface is connected to said apparatus by a hinge,
    at least one electronic device supporting surface interior to said apparatus, concealed when said movable surface is in said closed position and accessible when said movable surface is in said open position and adapted to support and display such an electronic device when in said open position in a manner which renders such an electronic device accessible and which prevents said movable surface from being closed when such an electronic device is supported by said electronic device supporting surface,
    a passage interior to said apparatus, concealed when said movable surface is in said closed position and accessible when said movable surface is in said open position, and
    a bottom surface.

2. The electronic device display apparatus according to claim 1, wherein a portion of said movable surface comprises an electronic device support.

3. The electronic device display apparatus according to claim 2, wherein said electronic device support comprises protective padding disposed thereon.

4. The electronic device display apparatus according to claim 1, wherein said electronic device supporting surface comprises protective padding disposed thereon.

5. The electronic device display apparatus according to claim 1, wherein said device further comprises a least one vent, concealed when said movable surface is in said closed position and accessible when said movable surface is in said open position.

6. The electronic device display apparatus according to claim 1, wherein said bottom surface comprises a cord recess.

7. The electronic device display apparatus according to claim 1, wherein said unrelated object is a vehicle.

8. The electronic device display apparatus according to claim 7, wherein said vehicle is an automotive vehicle.

9. The electronic device display apparatus according to claim 1, wherein said apparatus further comprises means for protecting surfaces onto which said apparatus is placed.

10. The electronic device display apparatus according to claim 7, wherein said apparatus further comprises means for protecting surfaces onto which said apparatus is placed.

11. The electronic device display apparatus according to claim 10, wherein said means for protecting surfaces onto which said apparatus is placed comprises tires.

12. The electronic device display apparatus according to claim 1, wherein such an electronic device cannot be supported by said electronic device supporting surface when said movable surface is in the closed position due to spatial limitations, and wherein a top side of said movable surface comprises a portion of said object when said movable surface is in the closed position.

* * * * *